Patented Jan. 7, 1941

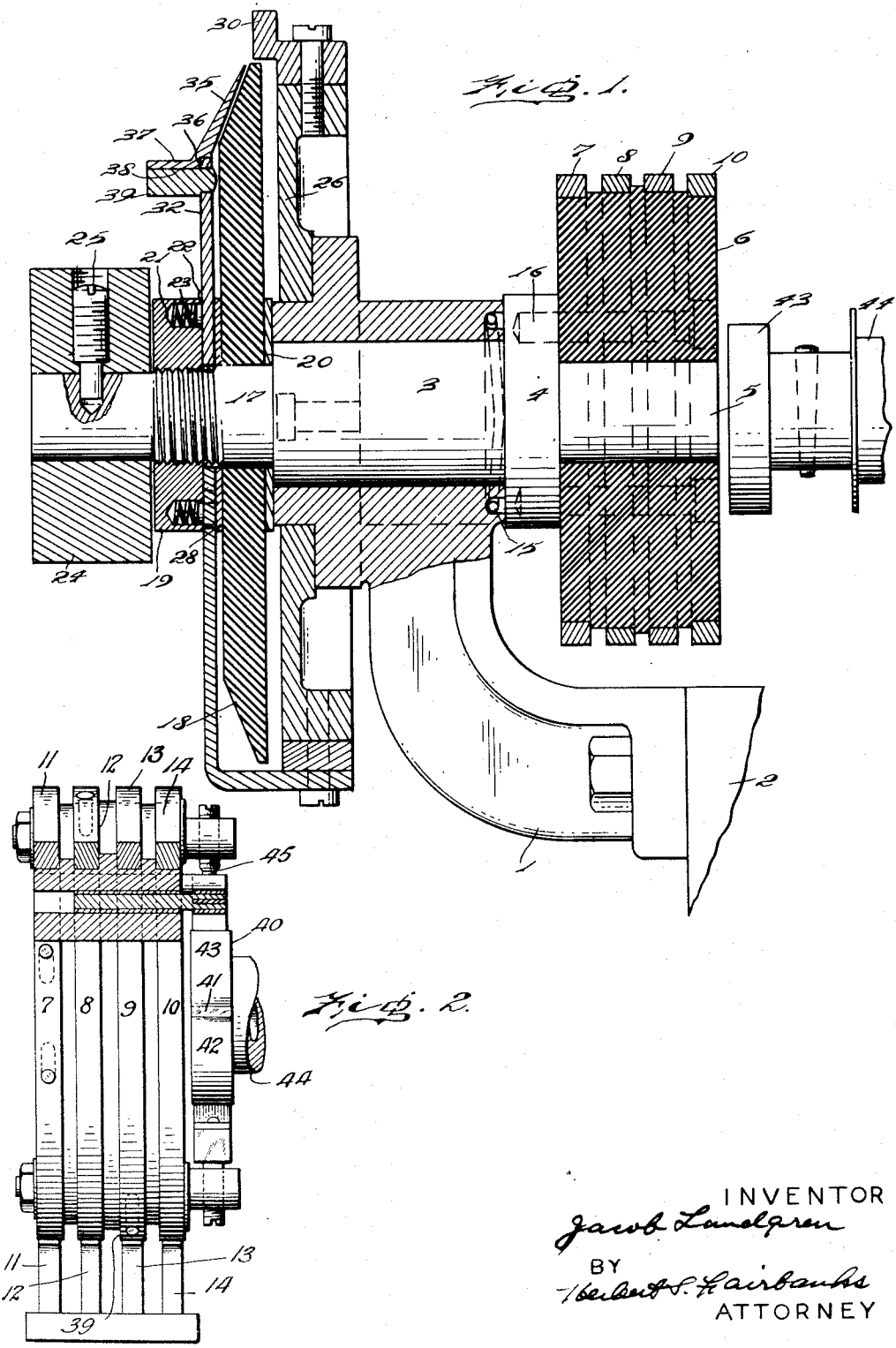

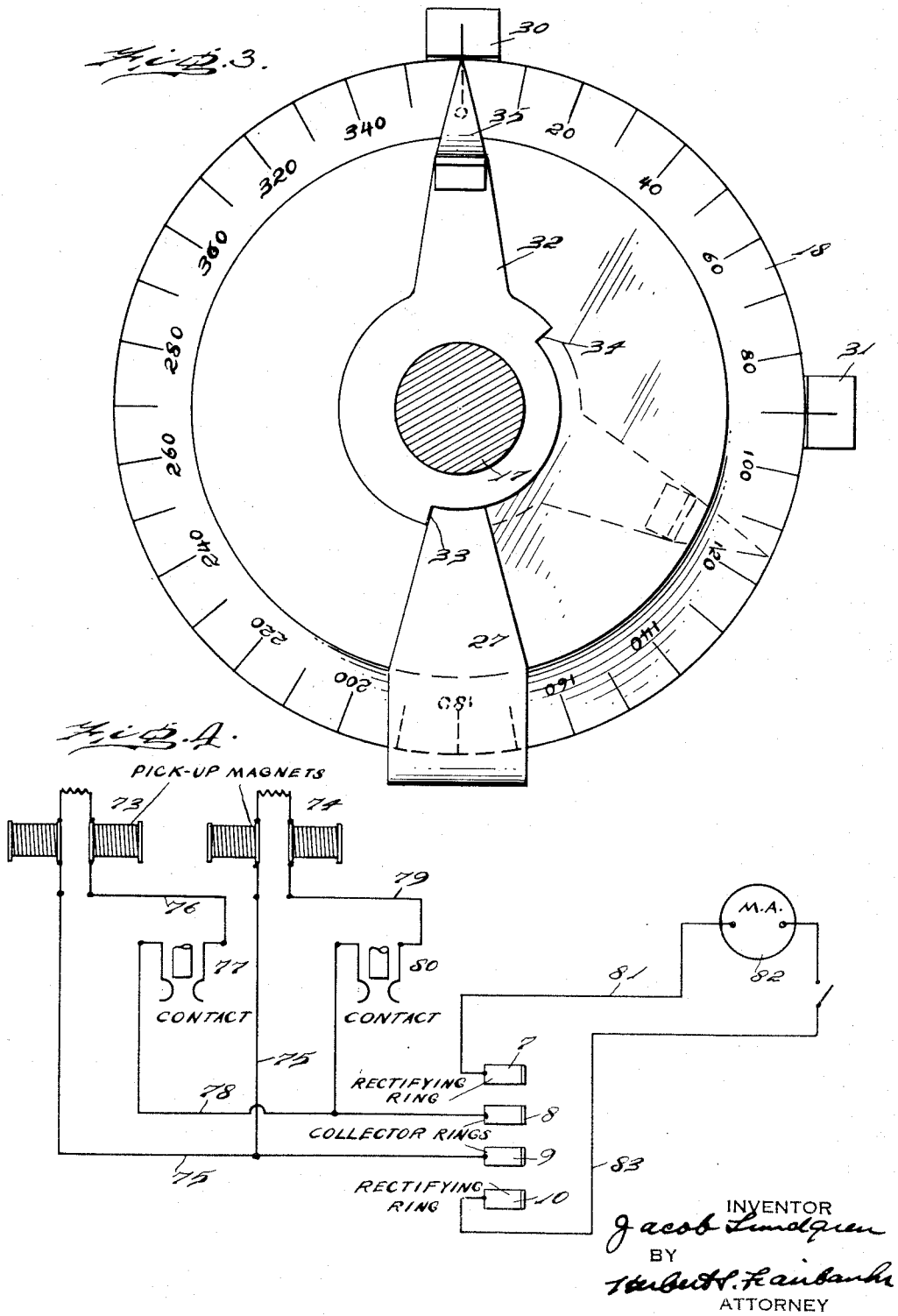

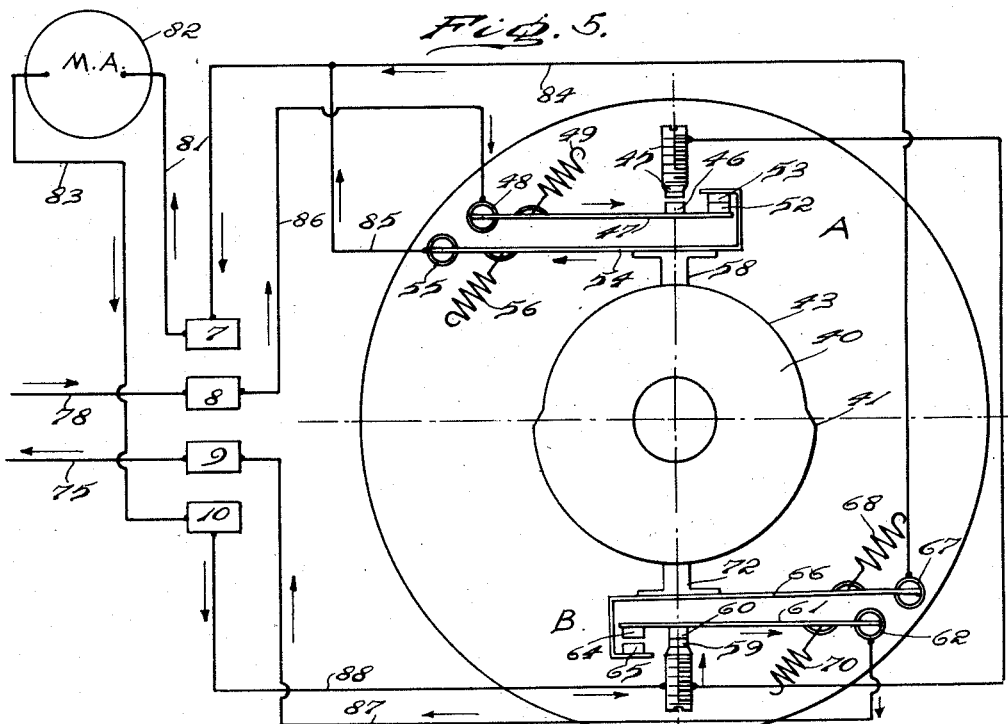

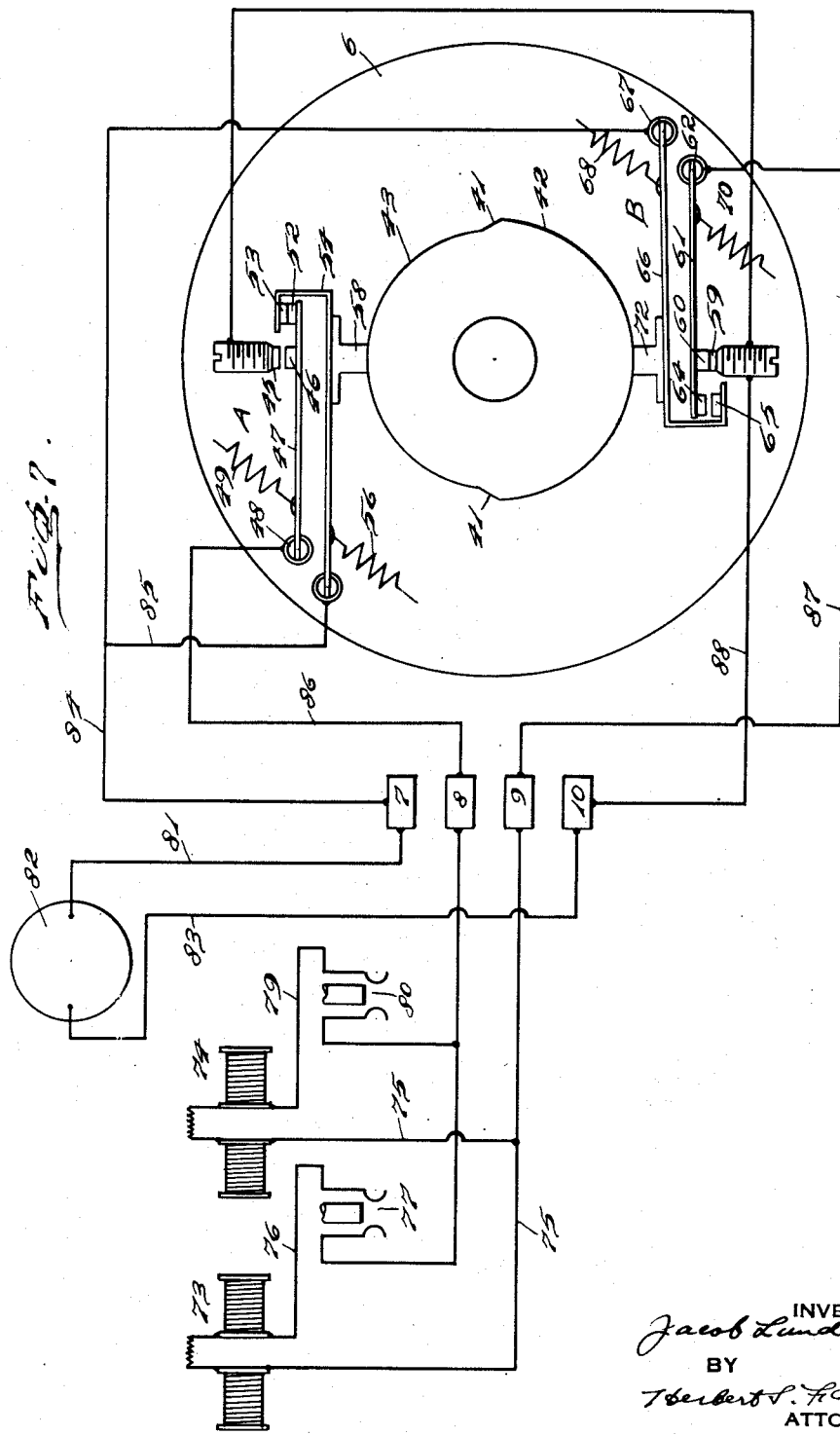

2,228,011

UNITED STATES PATENT OFFICE 2,228,011

CIRCUIT CONTROLLING MECHANISM FOR BALANCING MACHINES

Jacob Lundgren, Philadelphia, Pa., assignor to Tinius Olsen Testing Machine Company, Philadelphia, Pa., a corporation of Pennsylvania Application June 29, 1937, Serial No. 150,965

4 Claims. (Cl. 73—53)

One object of this invention is to devise a novel circuit controlling mechanism for balancing machines wherein the current can be reversed without any appreciable lag.

A further object of this invention is to devise a novel commutator and cooperating switch mechanism whereby the amount and the angle of unbalance in a body under test can be visibly indicated.

A further object of the invention is to devise a novel construction and arrangement of switch mechanism.

With the above and other objects in view as will hereinafter clearly appear, my invention comprehends a novel circuit controlling mechanism for balancing machines.

It further comprehends novel commutator mechanism, novel switch mechanism cooperating therewith and novel indicating mechanism.

Other novel features of construction and advantage will hereinafter clearly appear in the detailed description and the appended claims.

For the purpose of illustrating the invention, I have shown in the accompanying drawings typical embodiments of it, which, in practice, will give satisfactory and reliable results. It is, however, to be understood that the various instrumentalities of which the invention consists can be variously arranged and organized and that the invention is not limited to the exact arrangement and organization of these instrumentalities as herein set forth.

Figure 1 is a sectional elevation showing a portion of a circuit controlling mechanism, embodying my invention.

Figure 2 is an elevation, partly in section of the commutator and certain of its adjuncts.

Figure 3 is a front elevation of the dial and pointer of the indicating mechanism, with the commutator shaft in section.

Figure 4 is a wiring diagram in which the reversing switches and connections thereto are omitted.

Figure 5 is a wiring diagram showing one position of the reversing switches.

Figure 6 is a wiring diagram showing another position of the reversing switches.

Figure 7 is a complete wiring diagram including the vibration pick-up devices and manually operated switches.

Similar numerals indicate corresponding parts.

Referring to the drawings:

As shown in Figure 1, the balancing machine has a bracket 1 secured to the balancing machine frame 2. The bracket 1 is apertured to receive a commutator shaft 3, having a collar 4 and a reduced extension 5, on which latter an insulating block 6 of the commutator is fixed. This block 6 carries spaced rings 7, 8, 9, and 10 with which cooperate respectively brushes 11, 12, 13 and 14 as shown in Figure 2. The commutator shaft 3 has a portion 17 of reduced diameter on which a graduated dial 18 by a locking nut 19 is secured. A thrust washer 20 is interposed between the dial 18 and the bracket 1, see Fig. 1. The inner face of the locking nut 19 is recessed at 21 to receive friction plugs 22, and springs 23 in the recesses tend to move the plugs 22 inwardly. A turning knob 24 is fixed on the reduced extension 17 of the commutator shaft 3 by a fastening device 25.

A plate 26 is fixed to the bracket 1, and a stop arm 27, see Figs. 1 and 3, is fixed to the plate 26 and extends upwardly in front of the dial 18. A thrust washer 28 is interposed between the plate 27 and the dial 18. The plate 26 has secured to it 90 degrees apart the indicators 30 and 31, each of which has a single graduation in proximity to the graduations of the dial 18, and spaced 90 degrees apart. The friction plugs 22 bear against a shifter hand 32 loosely mounted on the reduced extension 17 of the commutator shaft 3. As shown in Fig. 3, a central portion of the periphery of the shifter hand 32 is cut away to form shoulders 33 and 34 which cooperate with the stop arm 27 to limit the turning movement of the shifter hand 32, and when the shoulder 33 contacts the stop arm 27, a shifter hand pointer 35 is in its zero position as shown in Fig. 3. For convenience of manufacture, the pointer 35 is made separate from the shifter hand. The shifter hand 32 has a slot 36 to receive the lower end of the pointer, and the pointer has an arm 37 which seats in a slot 38 in a shouldered pin 39 swaged to the shifter hand.

The insulating block 6 of the commutator, see more particularly Figs. 5 and 6, has two switch mechanisms A and B mounted on it and disposed 180 degrees apart. Each of these switch mechanisms A and B are of the same construction and are controlled by a cam 40 having cam faces 41 and dwells 42 and 43. The cam 40 is mounted on a shaft 44 of the balancing machine and this shaft 44 is driven in definite speed relationship with that of the rotatable body being tested for unbalance.

Each switch mechanism A and B has two sets of contacts, one set of which is closed when the other set is opened in order to provide for the quick reversal of the electric circuits.

Referring now more particularly to Figs. 5 and 6, it will be clear that the switch mechanism A has a stationary contact 45 carried by the block 6 and cooperating with a movable contact 46 on a contact carrying arm 47, one end of which is fixed to a post 48 on the block 6. A spring 49 connected to the contact carrying arm 47 and to the block 6 tends to move the movable contact 46 towards the stationary contact 45. The arm 47 is a straight arm which carries a second contact 52 to cooperate with a contact 53 on a cam actuated arm 54 having one end fixed to a post 55 on the block 6. The contacts 46 and 52 are on the same side of the arm 47, and the free end portion of the cam actuated arm 54 is deflected over the free end of the contact carrying arm 47. A spring 56 connected with the cam actuated arm 54 and the block 6, tends to retain a pressure member 58 fixed to such arm 54 in engagement with the periphery of the cam 40.

The switch mechanism B has a stationary contact 59 on the block 6, which cooperates with a contact 60 on a contact carrying arm 61 having one end carried by a post 62 on the block 6. The contact carrying arm 61 has also a contact 64 to cooperate with a contact 65 on the deflected end of a cam actuated arm 66 having one end mounted on a post 67 on the block 6. A spring 68 connected with the arm 66 and a fixed part tends to retain a pressure member 72 on the periphery of the cam 40. A spring 70 connected to the contact carrying arm 61 and to the block 6 tends to move the movable contact 60 towards the stationary contact 59.

The unbalance in the rotatable body is translated into electrical energy by electric generators illustrated in the form of pick-up magnets 73 and 74 which form electric pick-ups and are selectively employed in accordance with whether a left end or right end plane of correction is being used.

The pick-ups 73 and 74 are connected by line 75 with the commutator ring 9. The pick-up 73 is connected by line 76 with a manually operated switch 77 and line 78 with commutator ring 8. The pick-up 74 is connected by line 79 with a manually actuated switch 80 and by line 78 with commutator ring 8. The rings 8 and 9 serve as collector rings. The commutator ring 7 is connected by line 81 with a meter 82. The meter 82 is connected by a line 83 with the commutator ring 10. A line 84 connects post 67 with commutator ring 7. A line 85 connects post 55 with line 84 and thereby commutator ring 7. A line 86 connects post 48 with commutator ring 8. A line 87 connects post 62 with commutator ring 9. A line 88 connects stationary contacts 45 and 59 with commutator ring 10.

The contacts 77 and 80 are selectively, manually operated when a left hand or right hand plane of correction is to be used. When the left hand plane of correction is to be used, the contact 77 is closed and the contact 80 is open. For a right hand plane of correction, the contact 80 is closed and the contact 77 is open.

The operation of the circuit controlling mechanism will now be apparent to those skilled in this art and is as follows:

Assuming now that the body to be tested is being rotated in the balancing machine, any unbalance in the body will cause vibratory movement of the body and the vibratory support on which it is mounted. These vibratory movements due to unbalance generate an electric current in the selected pick-up which is in operation by closing of its manually operated switch 77 or 80 and such current passes to the commutator rings 8 and 9 of the commutator.

Since a D. C. meter is employed, it is necessary to change the direction of the current at half cycle intervals, and this can be accomplished at will at any point in the circumference of a circle by turning the commutator shaft.

The cam 40 is revolving in definite speed relationship with the body being tested and as a cam face 41 engages a pressure member 58 or 72 the set of contacts which was closed is opened and the set of contacts which were open is closed. This action is substantially instantaneous and no appreciable lag is present in the opening or closing of a circuit, so that there is a quick reversal of the circuit in the switch mechanisms A and B.

The knob 24 is turned counter-clockwise, the shifter hand 32 and pointer 35 moving with it until the meter reads zero. When this point is reached, the pointer 35 is moved to the left against its stop, shoulder 33 contacting stop arm 27, when pointer 35 will coincide with the graduation of angle indicator 30, and the angle of unbalance is indicated on the dial 18 at the graduation on indicator 30.

The knob 24 is now turned to the right in a clockwise direction, the pointer 35 moving with it, until the pointer coincides with the graduation or index line of the amount position indicator 31. In this position, the meter 82 will show a maximum reading and indicate the amount of unbalance.

As disclosed in the Ohlson Patent 2,054,267 and as now well known in the art of balancing rotatable bodies, the unbalanced forces will cause a set of pick-up magnets to generate an alternating current proportional to the vibration and therefore proportional to the unbalance to be measured. The phase relation of this alternating current to the rotation of the part being balanced indicates the angle of unbalance. The output from the pick-up magnets or coils can therefore be represented by a sinusoidal curve, and, in order to rectify this current so that a D. C. meter can be used, the direction of the current is reversed at half cycle intervals, so that the D. C. meter will receive two direct current impulses for every revolution or cycle of the revolving body under test. This is represented by the following:

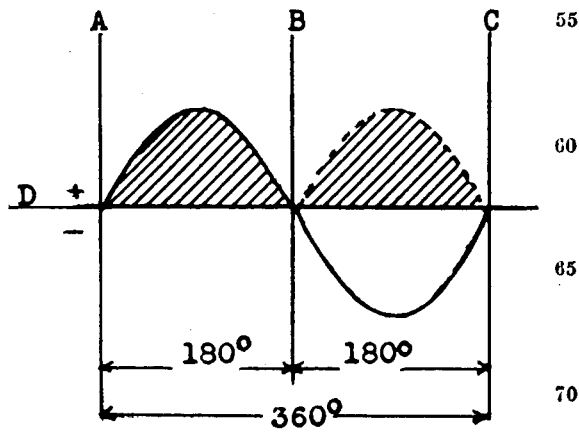

Assume that the contact takes place at A, B and C, or where the curve crosses the axis D. For such a setting the direct contacts are closed from A to B and the reverse contacts are open for the same period. From B to C, the direct contacts are open and the reverse contacts are closed. This has the effect of throwing the negative part of the curve between B and C up into the position shown by the dotted line. This will give a maximum reading of the D. C. meter.

If the commutator is shifted 90° from the position for maximum reading as above indicated, then the positive and negative areas are equal, and consequently the D. C. meter will read zero. This can be shown as follows:

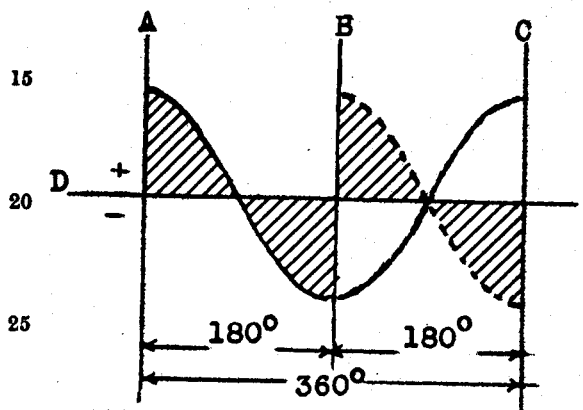

If the commutator is shifted still further in the same direction, the negative area will exceed the positive area and the meter pointer will move in a reverse direction, and the meter will not register.

The commutator setting which gives zero reading on the meter indicates the angle of unbalance which angle can be read from the dial 18 opposite the mark 30. The pointer 35 indicating angle of unbalance is stopped in its angle indicating position by stop arm 27. The pointer 35 moves with the dial when the commutator is turned 90° to the right by the knob 24 in order to obtain the maximum reading of the meter which is proportional to the amount of unbalance. The angle between the marks on the indicators 30 and 31 is 90° and the pointer 35 serves not only to indicate the angle but also shows when the operator has turned the commutator exactly 90°.

The alternating current generated by the vibratory movements of the body under test is rectified by a novel cam type commutator, the cam 40 of which rotates in synchronism with the body being tested. The cam has two dwells 180° apart and the cam followers and contacts are so arranged that one set of contacts remains closed for 180° or one half turn of the cam and the other set closes for the next 180°. The contacts and cam actuated members 58 and 72 are mounted on the commutator block 6 which is turned about the axis of the cam by turning the knob 24 and its relative position is indicated by the graduated dial 18.

Assuming now that the shaft 44 of the balancing machine is revolving thereby revolving the body being tested, and also the cam 40 of the commutator. With the parts in the position seen in Figure 5, the pressure member 58 is riding on the dwell portion of the smaller radius of the cam 40 so that the contacts 52 and 53 are closed and the contacts 45 and 46 are open. The current generated by a selected pick-up by closing a manually actuated switch 77 or 80, passes by line 78, ring 8, line 86, contact carrying arm 47, contacts 52 and 53, contact carrying arm 54, line 85, line 84, ring 7 and line 81 to meter 82. The return from the meter is by line 83, ring 10, line 88, contacts 59 and 60, contact carrying arm 61, line 87, ring 9 and line 75 to the electric pick-up which is operating.

When the pressure member 58 is riding on the dwell portion of greater radius of the cam 40 as shown in Figure 6, the contacts 52 and 53 are open and the contacts 45 and 46 are closed. The current from a selected pick-up now passes by line 75, ring 9, line 87, contact carrying arm 61, contacts 64 and 65, contact carrying arm 66, line 84, ring 7 and line 81 to meter 82. The return from the meter is by line 83, ring 10, line 88, contacts 45 and 46, contact carrying arm 47, line 86, ring 8 and line 78 to the selected electric pick-up which is operating. The current passing from an electric pick-up to the meter is reversed at half cycle intervals during one revolution of the rotatable body being tested.

Having thus described my invention, what I claim as new and desire to secure by Letters Patent is:

1. In a reversing switch mechanism, a stationary contact, a movable contact carrying arm, a first and second contact on the same side of said arm, the first of which cooperates with said stationary contact to open and close an electric circuit, a spring to move said contact carrying arm towards said stationary contact, a second movable contact carrying arm having a free end deflected rearwardly over said first contact carrying arm, a contact on the inner face of the deflected end of said second arm and cooperating with said second contact of said first arm to open and close said circuit, a rotatable cam having cam faces 180° apart to actuate said second contact carrying arm, whereby as one set of contacts of a switch closes, the other set of contacts of such switch opens, a spring to maintain said second arm in operative relation with said cam, and means to bodily, rotatably move all of said switch mechanism except the cam about the axis of the cam to cause the reversal of the circuit to take place at any point around a circle.

2. In a reversing switch mechanism, two sets of reversing switches spaced 180° apart, each comprising a stationary contact, a movable contact carrying arm, a first and second contact on the same side of said arm, the first of which cooperates with said stationary contact to open and close an electric circuit, a spring to move said contact carrying arm towards said stationary contact, a second movable contact carrying arm having a free end deflected rearwardly over said first contact carrying arm, a contact on the inner face of the deflected end of said second arm and cooperating with said second contact of said first arm to open and close said circuit, a rotatable cam having cam faces 180° apart to actuate said second contact carrying arm, whereby as one set of contacts of a switch closes, the other set of contacts of such switch opens, a spring to maintain said second arm in operative relation with said cam, and means to bodily, rotatably move all of said switch mechanism except the cam about the axis of the cam to cause the reversal of the circuit of each switch to take place at any point around a circle.

3. In an unbalance indicator for rotatable bodies, an electric pick-up to generate an A. C. current proportional to unbalance in selected planes of the body, a meter, a commutator, mounted for rotatable adjustment having reversing switch mechanism electrically connected with said pick-up and with said meter, means driven in unison with said body to actuate said reversing switch mechanism to reverse the current from said pick-up at half cycle intervals, a graduated dial rotatably adjustable with said commutator, a pointer normally movable with said dial when the latter is turned and capable of being turned relatively to the dial, stationary indicators spaced 90° apart around the periphery of the dial to indicate the positions of the pointer at which the angle and the amount of unbalance, respectively, are to be determined, and a stop for the pointer to stop the pointer at the mark indicative of the position of the dial for reading the angle of unbalance, the amount of unbalance being indicated on the meter when the dial has been turned 90° from its angle reading position as shown by registration of the pointer with the amount indicator.

4. In an unbalance indicator for rotatable bodies, electric pick-ups to generate an A. C. current proportional to unbalance in selected planes of the body, a meter, a commutator, mounted for rotatable adjustment having reversing switches disposed 180° apart and electrically connected with said pick-ups and with said meter, means driven in unison with said body to actuate one of said reversing switches to reverse the current from a selected pick-up at half cycle intervals, a graduated dial rotatably adjustable with said commutator, a pointer normally movable with said dial when the latter is turned and capable of being moved relatively to the dial, stationary indicators spaced 90° apart around the periphery of the dial to indicate the positions of the pointer at which the angle and the amount of unbalance respectively are to be determined, and a stop for the pointer to stop the pointer at the mark indicative of the position of the dial for reading the angle of unbalance, the amount of unbalance being indicated on the meter when the dial has been turned 90° from its angle reading position as shown by registration of the pointer with the amount indicator.

JACOB LUNDGREN.